US005659391A

United States Patent [19]
Carrieri

[11] Patent Number: 5,659,391
[45] Date of Patent: Aug. 19, 1997

[54] EARTH MONITORING SATELLITE SYSTEM WITH COMBINED INFRARED INTERFEROMETRY AND PHOTOPOLARIMETRY FOR CHEMICAL AND BIOLOGICAL SENSING

[75] Inventor: Arthur H. Carrieri, Abingdon, Md.

[73] Assignee: The United States of America as represented by the Secretary of the Army, Washington, D.C.

[21] Appl. No.: 592,257

[22] Filed: Jan. 26, 1996

[51] Int. Cl.$^6$ .................................................. G01B 9/02
[52] U.S. Cl. .................................... 356/351; 356/346
[58] Field of Search .................................. 356/345, 358, 356/359, 360, 351, 349

[56] References Cited

U.S. PATENT DOCUMENTS 4,884,886  12/1989  Salzman et al. .
5,208,651   5/1993  Buican .

OTHER PUBLICATIONS

Buican, Tudor N., "Real-Time Fourier Transform Spectrometry for Flourescence Imaging and Flow Cytometry", SPIE vol. 1205 Bioimaging and Two-Dimensional Spectroscopy (1990) (no month available).

Primary Examiner—Frank G. Font
Assistant Examiner—Robert Kim
Attorney, Agent, or Firm—Ulysses John Biffoni

[57] ABSTRACT

Apparatus for producing interferograms on array of light detectors is described in which light from a field of view is gathered by a concave Newtonian mirror, collimated by a Schwarzchild objective and directed along a first optical path having PEM's modulated so as to act like an interferometer between a pair of linear polarizers and a lens for imaging light passing through said polarizers onto the array. Scattergrams are produced on the array by a laser in a second optical path that includes a linear polarizer, a modulated PEM for producing light that is polarization modulated, optical elements for directing the circularly polarized light into the field of view of the Newtonian mirror, a modulator for causing the PEM's in the first optical path to elliptically polarize light and a device for extracting the first linear polarizer in the first optical path from that path. The distance between the apparatus and an area under examination is determined by turning on the laser, sinusoidally modulating the PEM in the second optical path, detecting the light modulated by that PEM so as to produce a first sinusoidal voltage, removing modulation from the PEM's in the first optical path and determining the phase difference of a second sinusoidal voltage produced by one light detector of the array and the first sinusoidal voltage.

12 Claims, 2 Drawing Sheets

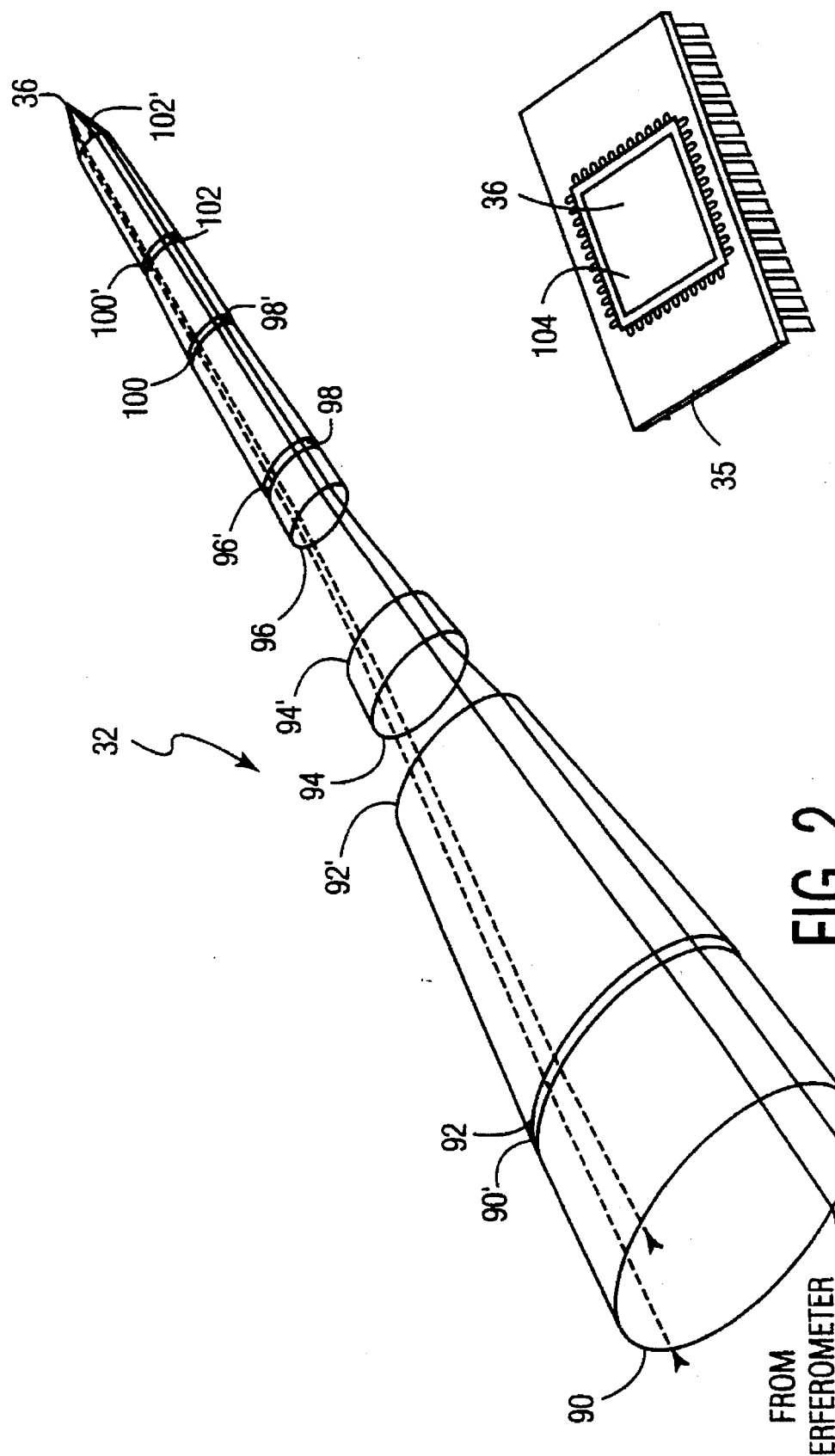

EARTH MONITORING SATELLITE SYSTEM WITH COMBINED INFRARED INTERFEROMETRY AND PHOTOPOLARIMETRY FOR CHEMICAL AND BIOLOGICAL SENSING

GOVERNMENTAL INTEREST

The invention described herein may be manufactured, used and licensed by or for the U.S. Government.

BACKGROUND OF THE INVENTION

Chemical contaminants have been detected by deriving the spectra of light emitted from them. As described in an article entitled "Bioimaging and Two-Dimensional Spectroscopy" published in 1990 in the Proceedings of the International Society for Optical Engineering, the spectra of fluorescence emanating from an area is derived by passing it through an interferometer that is tuned to reinforce different frequencies in the range of interest. Light passing through the interferometer is imaged onto an array of n×n light detectors where n is a pixel element of the detector. Each pixel element of the detector projects to an area in the field-of-view (FOV) of the measuring instrument (object space). Each pixel measures an interferogram that contains all radiation frequencies from the irradiating object within its projected object space. The electrical signals produced by the interferogram for all frequencies in the detection bandwidth are then subjected to analysis to identify the substances producing the fluorescence. The analysis involves the application of a fast Fourier transform (FFT) and several filtering operations to develop a pattern that is matched with the pattern of a known substance by a fully trained neural network. Although a Michelson interferometer could be used, the interferometer described in the article is comprised of two linear polarizers separated by birefringent crystals that can be respectively modulated or tuned by application of voltage waves. The crystals are called photoelastic modulators, PEM's. For proper operation of an interferometer, light from the emitting area being analyzed by the interferometer must be collimated to a narrow acceptance angle, or below that angle, of it's birefringement crystal. The system just described is referred to as being passive.

Analysis of an area to identify biological particles such as bacteria and viruses has been accomplished by an active system in which monochromatic polarization-modulated light, from a laser, is back-scattered by the particles and imaged onto a detector array. The light back-scattered by the biological particles is examined in the form of a Mueller matrix whose elements describe all polarization states of the back-scattered light at each pixel of the detector array. The Mueller matrix instrument is comprised of a linear polarizer and a modulated PEM positioned in the transmitted beam, a plurality of modulated PEM's and another linear polarizer positioned in the received beam. This combination of optical elements is referred to as a Mueller matrix spectrometer, MMS, and is described in an article entitled "Mid Infrared polarized Light Scattering" that was published in 1992 in the National Technical Information Series, catalog number AD-A247-359/3. Light from the last polarizer in the received back-scattered beam is imaged onto an n×n array of light detectors so as to produce n squared scattergrams, one per pixel in the detector array. The scattergram is processed and transformed into the Mueller elements, filtered and distributed to a neural network trained to pattern match each biological compound to its Mueller matrix characteristic.

SUMMARY OF THE INVENTION

The systems described above for identifying chemical and biological contaminants are entirely separate and both require their own optical means for viewing an area being inspected so that their combined weight would present a significant problem to the designer of a satellite.

In accordance with this invention, the passive operation used for identifying chemical contaminants and the active operation for identifying biological contaminants are largely carried out by the same optical components so as to reduce cost as well as weight.

The optical system of the invention is comprised of a primary mirror of a Newtonian telescope for gathering light from the object area of interest and directing it to an annular spherical primary mirror of a Schwarzchild objective (SO) that in turn reflects that light to a secondary spherical mirror of the SO. Light reflected by the secondary SO mirror passes through a correcting lens located inside the center bore of the SO primary mirror. A double sided flat mirror is located after the primary SO mirror and mounted 45 degrees transversely to the axis of the primary Newtonian telescope mirror. A double sided mirror is mounted transversely of the axis of the primary reflecting mirror of the Newtonian telescope.

When operating in the passive mode, so as to identify chemical contaminants, light is gathered from the object area of interest by the primary mirror of the Newtonian telescope and passed through the Schwarzchild objective and the correction lens to one side of the double sided mirror that directs it to a first optical path including an interferometer comprised of a plurality of PEM's mounted between a pair of linear polarizers. Light from the interferometer is focused onto an array of light detectors so as to produce n–n interferograms, where n squared is the number of pixel elements in the detector array. The PEM's are modulated by voltage waves of different frequencies, and pass the central portion of the infrared radiation band ranging from 700–1400 wavenumbers (cm −1 power). The PEM's are modulated by voltage waves, preferably sinusoidal waves of different frequencies, so as to pass the central portion of the infrared band.

When operating in the active mode, light from a laser is successively passed in a second optical path including a third linear polarizer, a single PEM modulated so as to act as a source of polarization modulation in the outgoing beam, and a beam expansion lens configuration for narrowing the divergence of the outgoing beam directed to the scattering area of interest.

Biological particles in the area are identified by their Mueller matrix in the backscattering direction: a response to stimulation by the polarization-modulated light from the laser. To determine the solid angles subtended by pixels of the detector array and the object irradiated area of interest, the scattered light is gathered by the primary mirror of the Newtonian telescope and passed via the primary and secondary mirrors of the Schwarzchild objective and the correction lens to the side of the double sided mirror that directs it into the first optical path. In this mode, however, the first linear polarizer of the interferometer is removed from the first path, and the PEM's therein are modulated so as to function as elliptical polarizers and form a Mueller matrix spectrometer. The light is imaged onto the array of light detectors forming n (squared) independent scattergrams that are analyzed to identify the bacterial contaminants present in the irradiated area referred to.

Thus, the primary mirror of the Newtonian telescope, the Schwarzchild objective, the correction lens, the double sided mirror and all but one of the elements in the first optical path, the first linear polarizer, function in both the passive and active modes of operation.

A further aspect of this invention is the provision of means for determining the distance between the satellite or other carrier and the imaged area of the object scene. Briefly, it operates by sinusoidally modulating the PEM in the path of the laser light, terminating the modulation of the PEM's in the first optical path and comparing the phase of the modulation with the phase of the sinusoidal modulation detected at one pixel of the array.

BRIEF DESCRIPTION OF THE DRAWINGS

FIG. 2 illustrates a multi-element lens for imaging light passing through an interferometer onto an array of light detectors; and.

FIG. 2A illustrates an array of light detectors.

DETAILED DESCRIPTION OF THE INVENTION

Figure 1:
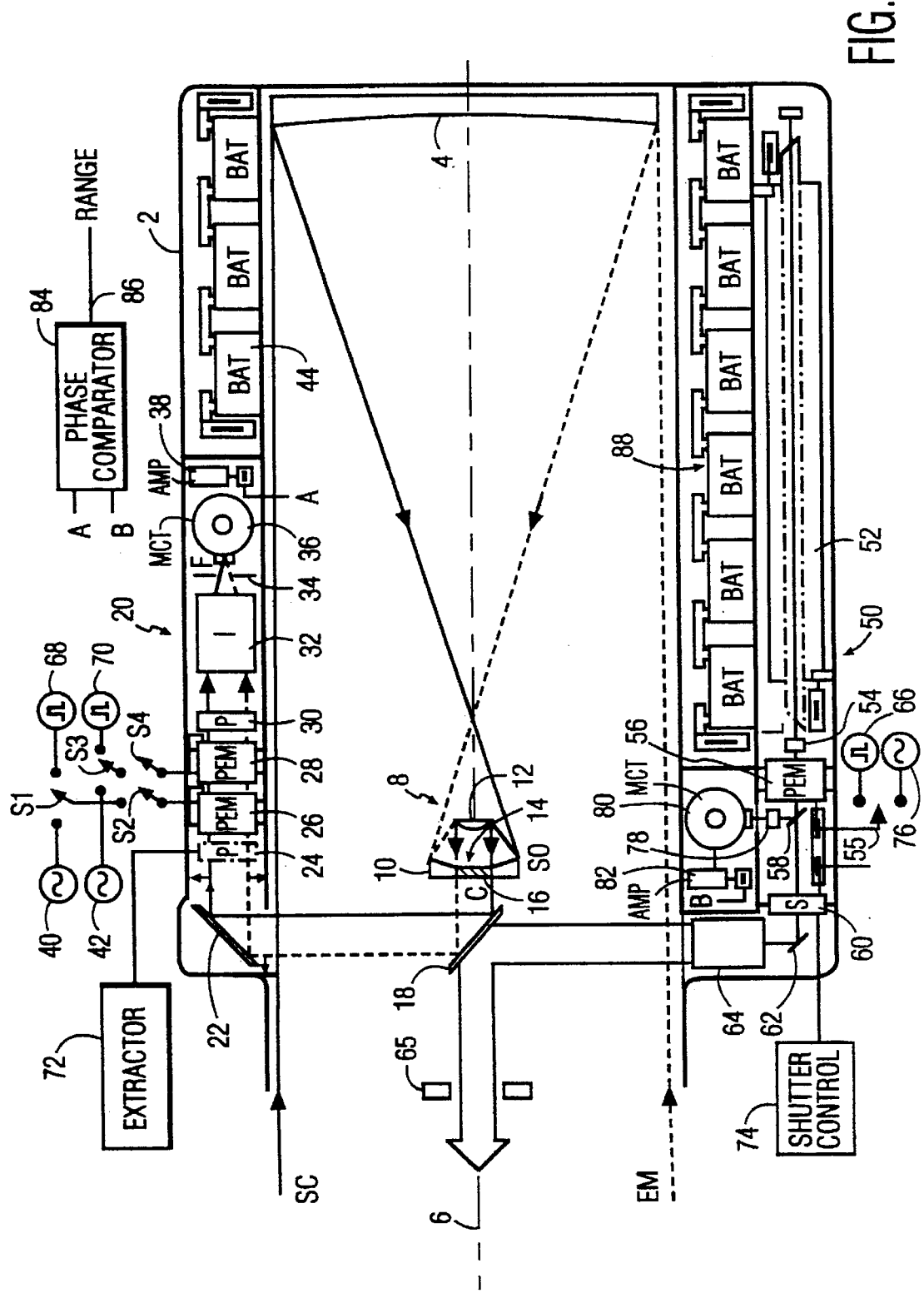
FIG. 1 is an axial cross section of a satellite of this invention.

The components of the satellite are contained within a barrel 2 that may be in the form of a cylinder. A primary mirror 4 of a Newtonian telescope is mounted in one end of the barrel 2 so as to gather light approaching it along its axis 6. A Schwarzchild objective 8 is centered on the axis 6. Light gathered by the mirror 4 is directed thereby to a spherical annular primary mirror 10 of the Schwarzchild objective 8, and a secondary mirror 12 of the objective is positioned to receive light from the primary mirror 10 and direct it through the center 14 of the annular primary mirror 10. A correction lens 16 located in the center 14 of the primary mirror 10 operates with the curvatures of the mirrors 10 and 12 to collimate light passing through it. One side of a mirror 18 directs collimated light passing through the correction lens 16 into a first optical path 20 including a mirror 22 that reflects light from the mirror 18 parallel to the axis 6. Also included in the first optical path 20 is an interferometer comprised of a first linear polarizer 24, PEM's 26 and 28, a second linear polarizer 30 and a lens system 32 shown in detail in FIG. 2. for focussing the light through an iris 34 onto an array 36 of light detectors that are respectively located at the pixels of the image. Each of the light detectors in the array 36 are connected to a separate amplifier, but only one amplifier 38 is shown having an output A.

The components thus far described operate in a passive mode and preferably in the mid infrared range so as to identify chemical contaminants in the following manner. Sources 40 and 42 of sine wave voltages of different frequencies such as 32 KHz and 34 KHz are respectively connected via switches S1, S2 and switches S3, S4 to the PEM's 26 and 28. Electrical power for the sources 40 and 42 for the array 36 of light detection and for their respective amplifiers such as 38 is provided by a bank 44 of batteries.

Additional components for operation in an active mode used for identifying biological contaminants are contained in a second optical path generally indicated at 50. Light from a laser 52 passes through a third linear polarizer 54, a PEM 56, a high transmission beam splitter (less than 1% reflective) 58, and, when open, a shutter 60 so as to fall on a mirror 62 that directs it perpendicularly to the axis 6 via a lens system 64 that expands the laser beam so as to decrease incident beam divergence. The other side of the two sided mirror 18 and an iris 65 directs the expanded beam within the field of view of the Newtonian telescope mirror 4.

Operation in the active mode also requires that the PEM 56 be modulated with waves from a source 66, herein shown as being square waves, so that it functions as a polarization modulator. The square waves are conducted to the PEM 56 via a switch 55. It is also required that the PEM's 26 and 28 be modulated so as to exhibit all linear and elliptical polarizations by application of voltage waves, herein shown as being square waves of different frequency, from sources 68 and 70 via switches $S_1$, $S_2$ and $S_3$, $S_4$, respectively. It is important that no combinations of the modulation frequencies for the PEM's 26, 28 and 56 be the same. A further requirement is that means 72 be provided for extracting the first linear polarizer 24 from the first optical path 20 and that a shutter control 74 be provided for permitting light to pass from the laser 52 only when the satellite is being used for active operation. The signals provided by the array of 36 of light detectors form a scattergram that is analyzed by means not shown to identify the biological contamination.

In accordance with another aspect of this invention, means are provided for measuring the distance of the satellite from the area being examined. This can only be done when the laser 52 is operative. The switch 55 is operated so as to connect the PEM 56 to a source 76 of sine waves rather than to the source 66 of square waves. The beam splitter 58 reflects less than one percent of the laser light striking it via a neutral density filter 78 to a single light detector 80. The voltage supplied by the detector 80 is amplified by an amplifier 82 so as to appear at an output B. At the same time the extractor 72 removes the first linear polarizer 24 from the first optical path 20 and removes modulation voltage from the PEM's 26 and 28 by opening the switches S2 and S4 so that the PEM's 26 and 28 do not modify the light passing through them. Under these conditions a sine wave of voltage will be produced at the output A. A phase comparater 84 having inputs respectively connected to the outputs A and B provides a signal at its output 86 indicative of the distance between the satellite and the area being examined. A bank 88 of batteries supplies power for the laser 52, the voltage sources 66, 76 the light detector 80 and the amplifier 82. Power for the voltage sources 68 and 70 could be supplied from the batteries of the bank 44.

Although this invention has been described in connection with a satellite the components thereof could be used in a different vehicle or at a fixed position.

From the foregoing description it is apparent that the polarizers 24 and 30 and the PEM's 26 and 28 constitute means adapted to function as an interferometer or as components of a Mueller matrix spectrometer depending on the modulation of the PEM's and whether or not the linear polarizer 24 is in the first optical path 20 or not.

FIG. 2 illustrates elements of the lens system 32 that images the output of the interferometer 24, 26, 28, 30 onto the array 36 of light detectors mounted on a chip carrier 35 (see FIG. 2A). In the following table, specifications for the surfaces 90, $90^1$; 92, $92^1$; 94, $94^1$; 96, $96^1$; 98, $98^1$; 100, $100^1$ and 102, $102^1$ are given. The image plane 104 of the light detector array 36 is also defined as shown in FIG. 2A. The array 36 has 466 rows and 466 columns of detectors of $Hg_{1-x} Col_x Te$, MCT that convert light into voltage.

The table also provides design information for the iris 65, the neutral density filter 78, the Schwarzchild primary mirror 10, the Schwarzchild secondary mirror 12, the front surface of the correction lens 16, the rear surface of the correction lens 16 and the flat mirror 18.

TABLE 1

OPTICS

| | Surface | Shape | Curvature | Medium | Diameter/ Length | Distance X | Distance Z Z Through Vertex | Pitch (Deg) |
|---|---|---|---|---|---|---|---|---|
| 65 | Iris/ Obscuration | round | 0.00000 | air | 1.0010(O.D.)/ 0.2540(I.D.) | 0.0000 | 0.05000 | 0 |
| 4 | Primary Mirror | sphere | −0.10000 | air | 1.0000 | 0.0000 | 6.50000 | 0 |
| 10 | Schwarzchild Primary | sphere | 0.95492 | air | 0.2540 | 0.0000 | 0.25000 | 0 |
| 12 | Schwarzchild Secondary | sphere | 2.74164 | air | 0.05080 | 0.0000 | 0.95802 | 0 |
| 16 | Correction Lens Front Surface | sphere | 0.16351 | air | 0.05100 | 0.0000 | 0.34874 | 0 |
| 616 | Correction Lens Back Surface | sphere | 0.50041 | ZnSe | 0.0510 | 0.0000 | 0.24365 | 0 |
| 18 | Newtonian 45° Mirror Flat | ellipse | 0.00000 | air | 0.1000 | 0.0000 | 0.15000 | 45 |
| 22 | Mirror | flat | ellipse | air | 0.0520 | 0.7500 | 0.15000 | −45° |
| 90 | Imaging Lens Front Surface | sphere | 5.96870 | air | 0.0520 | 0.7500 | 0.20000 | 0 |
| $90^1$ | Imaging Lens Back Surface | sphere | −1.10173 | ZnSe | 0.0520 | 0.7500 | 0.22044 | 0 |
| 92 | Imaging Lens Front Surface | sphere | 9.36971 | air | 0.0500 | 0.7500 | 0.22044 | 0 |
| $92^1$ | Imaging Lens Back Surface | sphere | 8.65955 | ZnSe | 0.0500 | 0.7500 | 0.25951 | 0 |
| 94 | Imaging Lens Front Surface | sphere | −3.24064 | air | 0.0250 | 0.7500 | 0.27041 | 0 |
| $94^1$ | Imaging Lens Back Surface | sphere | 11.63046 | ZnSe | 0.0250 | 0.7500 | 0.27571 | 0 |
| 96 | Imaging Lens Front Surface | sphere | −11.61001 | air | 0.0200 | 0.7500 | 0.29237 | 0 |
| $96^1$ | Imaging Lens Back Surface | sphere | 4.22615 | ZnSe | 0.0200 | 0.7500 | 0.29767 | 0 |
| 98 | Imaging Lens Front Surface | sphere | 5.24775 | air | 0.0150 | 0.7500 | 0.29767 | 0 |
| $98^1$ | Imaging Lens Back Surface | sphere | −8.83803 | ZnSe | 0.0150 | 0.7500 | 0.31357 | 0 |
| 100 | Imaging Lens Front Surface | sphere | −3.68679 | air | 0.0150 | 0.7500 | 0.31357 | 0 |
| $100^1$ | Imaging Lens Back Surface | sphere | −6.9149.5 | ZnSe | 0.0150 | 0.7500 | 0.32497 | 0 |
| 102 | Imaging Lens Front Surface | sphere | 3.74194 | air | 0.0100 | 0.7500 | 0.32497 | 0 |
| $102^1$ | Imaging Lens Back Surface | sphere | −2.78805 | ZnSe | 0.0100 | 0.7500 | 0.33860 | 0 |
| 104 | Imaging Lens CCD Array | square | 0.00000 | air | 0.0020 | 0.7500 | 0.34989 | 0 |

Other design criteria are as follows:

The field of view angle is 0.356 mrad.

The Newtonian primary 4 is spherical.

The Schwarzchild primary mirror 10 and secondary mirror 12 have monocentric radii with spacing d=2 f.

The convex radius of the mirror 12 is $R_2=(\sqrt{5}-1)f$.

The concave radius of the mirror 10 is $R_1=(\sqrt{5}+1)f$.

The distance from $R_1$ to the focus f is $R_1f=(\sqrt{5}+2)f$.

The clear aperture of the mirror 12 $Y_1=(\sqrt{5}+2)Y_2$, and the obscuration is 0.20.

The correction lens 16 is ZnSe. The curvatures of the correction lens 16 are optimized for best collimation.

The optics of the Schwarzchild objective 10 and 12 produce zero spherical aberration, coma and astigmatism.

The emission ray EM enters the satellite through its pupil, iris 65, at a subtended half angle of 0.178 radians.

I claim:

1. Apparatus for remotely sensing chemical and biological material comprising:

(a) a housing having an axis;

(b) a concave mirror mounted coaxially with said axis;

(c) an objective on said axis for collimating light received from said concave mirror;

(d) means for directing collimated light passing through said objective along a first optical path;

(e) a first linear polarizer, first and second PEM's and a second linear polarizer mounted in the order named in said first optical path so that when said apparatus is operating in a passive mode said collimated light first passes through said first linear polarizer, then said first and second PEM's, then said second polarizer;

(f) an array of light detectors;

(g) means for imaging light passing through said second linear polarizer onto said array;

(h) means for selectively modulating said first and second PEM's with sine or square waves of voltage;

(i) means for extracting said first linear polarizer from said first optical path;

(j) a laser for directing laser light along a second optical path for operation of said apparatus in an active mode;

(k) means for controlling the emission of said laser light so that it is only emitted from said apparatus when said apparatus is operating in an active mode;

(l) a third polarizer and a third PEM mounted in the order named in said second optical path so that when said apparatus is operated in an active mode said laser light first passes through said third polarizer then said third PEM;

(m) means for directing said laser light passing through said third pEM along said housing axis and out of said apparatus into the field of view; and (n) means for modulating said third PEM with square waves of voltage so as to cause it to polarization modulate the laser light passing through it;

wherein during passive mode operation an interferogram is produced on said array when said first linear polarizer is in said first optical path and said first and second PEM's are modulated with sine wave voltages and said laser light is not emitted; and wherein during active mode operation a scattergram is produced on said array when said laser light is emitted from said apparatus and backscattered light from said laser light passes back into said apparatus along said housing axis, said first linear polarizer is extracted from said first optical path and said first and second PEM's are modulated with square waves of voltage.

2. Apparatus as set forth in claim 1 further comprising:

(a) a single light detector;

(b) means for directing a fraction of the laser light passing through said third PEM onto said single light detector;

(c) means for modulating said third PEM with a sine wave of voltage;

(d) means for eliminating any modulation of said first and second PEM's;

(e) a phase comparator having first and second inputs and an output;

(f) means for coupling said first input of said phase comparator to said single light detector; and (g) means for coupling said second input of said phase comparator to one of the light detectors in said array;

wherein the difference between the phase of voltage derived from said light detector and said light detector in said array is an indication of the range of said housing from matter reflecting light received along said housing axis.

3. The apparatus of claim 2, wherein said means for directing a fraction of said laser light comprises a beam splitter, said beamr splitter operating so that less than one percent of said laser light is reflected to said single light detector.

4. The apparatus of claim 2, wherein said means for modulating said third PEM with a sine wave of voltage comprises:

(a) a source of sine waves of voltage; and (b) a switch connecting said source of sine waves of voltage to said third PEM.

5. Apparatus as set forth in claim 1 wherein:

said objective is a Schwarzchild objective to collimate light.

6. Apparatus as set forth in claim 1 wherein (a) said means for directing collimated light along said first optical path is one side of a flat two-sided mirror and a first flat one-sided mirror; and (b) said means for directing laser light passing through said third PEM along said housing axis comprises a second flat one-sided mirror, a lens system and the other side of said flat two-sided mirror, said lens system being used to expand the cross-sectional area of the laser light.

7. Apparatus as set forth in claim 1 wherein said objective is comprised of:

(a) a spherical concave annular mirror mounted so as to receive light from said concave mirror;

(b) a convex mirror mounted so as to receive light from said annular mirror; and (c) a correction lens mounted in the center of said annular mirror.

8. The apparatus of claim 1, wherein said means for imaging light passing through said second linear polarizer onto said array comprises a plurality of lenses.

9. The apparatus of claim 1, wherein said means for selectively modulating said first and second PEM's comprises:

(a) a plurality of sources of sine wave voltages, said sine wave sources having different frequencies;

(b) a plurality of sources of square wave voltage, said square wave sources having different frequencies; and (c) a plurality of switches connecting said sources to said PEM's so that said PEM's can be modulated by said sine wave voltage, or by said square wave voltage or be unmodulated.

10. The apparatus of claim 1, wherein said means for controlling the emission of laser light comprises a shutter control.

11. The apparatus of claim 1, wherein said means for modulating said third PEM comprises:

(a) a source of square waves of voltage; and (b) a switch connecting said source of square waves of voltage to said third PEM.

12. Apparatus for remotely detecting chemical and biological material comprising:

(a) means for collecting light from a field of view;

(b) means in a first optical path for producing an interferogram in response to a first modulation of said light and for producing a scattergram in response to a second modulation of said light;

(c) an array of light detectors mounted to receive light passing through said last mentioned means;

(d) a laser;

(e) means for producing light that is polarization modulated from said laser; and (f) means for directing the polarization modulated light into said field of view.

* * * * *